United States Patent [19]
Cho et al.

[11] Patent Number: 6,049,450
[45] Date of Patent: Apr. 11, 2000

[54] PORTABLE COMPUTER ON WHICH A COMMUNICATION DEVICE CAN BE MOUNTED

[75] Inventors: Kwan-Hwi Cho, Kyungki-do; Nam-Mi Kim, Seoul, both of Rep. of Korea

[73] Assignee: SamSung Electronics Co., Ltd., Kyungki-do, Rep. of Korea

[21] Appl. No.: 09/170,290

[22] Filed: Oct. 13, 1998

[30] Foreign Application Priority Data

Oct. 13, 1997 [KR] Rep. of Korea ...................... 97-52251

[51] Int. Cl.⁷ .............................. H05K 5/00; H05K 7/16; H04N 7/00
[52] U.S. Cl. .......................... 361/683; 361/686; 361/680; 361/681; 361/725; 345/169; 348/552
[58] Field of Search ........................... 361/683, 680–682, 361/686, 724–727; 345/169, 905; 429/96–100; 307/150; 348/552

[56] References Cited

U.S. PATENT DOCUMENTS

| | | |
|---|---|---|
| 4,825,395 | 4/1989 | Kinser, Jr. et al. ...................... 364/708 |
| 4,878,293 | 11/1989 | Kinser, Jr. et al. ....................... 29/850 |
| 5,001,659 | 3/1991 | Watabe ................................... 364/708 |
| 5,020,090 | 5/1991 | Morris ........................................ 379/58 |
| 5,193,069 | 3/1993 | Furuya .................................... 364/708 |
| 5,307,297 | 4/1994 | Iguchi et al. ......................... 364/708.1 |
| 5,494,447 | 2/1996 | Zaidan ...................................... 439/31 |
| 5,517,387 | 5/1996 | Smith ...................................... 361/686 |
| 5,583,744 | 12/1996 | Oguchi et al. .......................... 361/683 |
| 5,594,619 | 1/1997 | Miyagawa et al. ..................... 361/681 |
| 5,619,395 | 4/1997 | McBride ................................. 361/683 |
| 5,850,998 | 12/1998 | Parsey et al. . |

FOREIGN PATENT DOCUMENTS 404010012A 1/1992 Japan ............................... G06F 1/16

*Primary Examiner*—Leo P. Picard
*Assistant Examiner*—A. Vortman
*Attorney, Agent, or Firm*—Robert E. Bushnell, Esq.

[57] ABSTRACT

The present invention relates to a portable computer on which a communication device can be mounted. Its object lies in maintaining the communication device more conveniently when the portable computer is in use by mounting the communication device on the portable computer. The latter comprises a main body and a battery mounted in rotatable fashion, centering around the main body, and a communication device mounting part for mounting the communication device on a part formed by the main body and the battery.

21 Claims, 4 Drawing Sheets

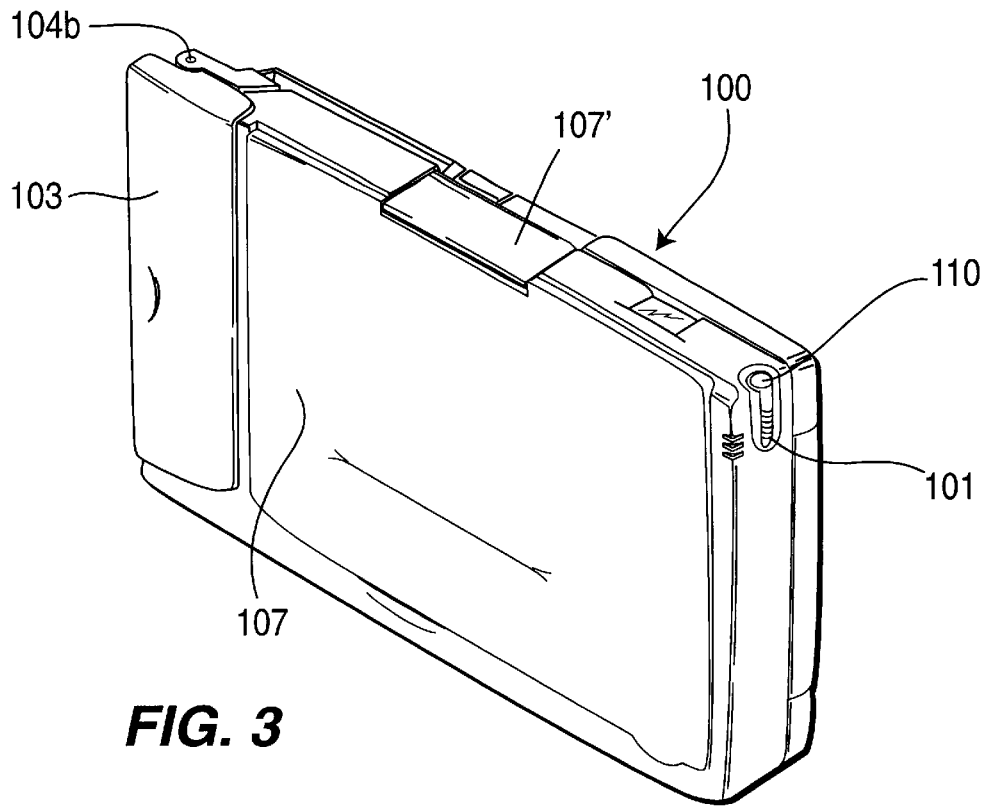
FIG. 3
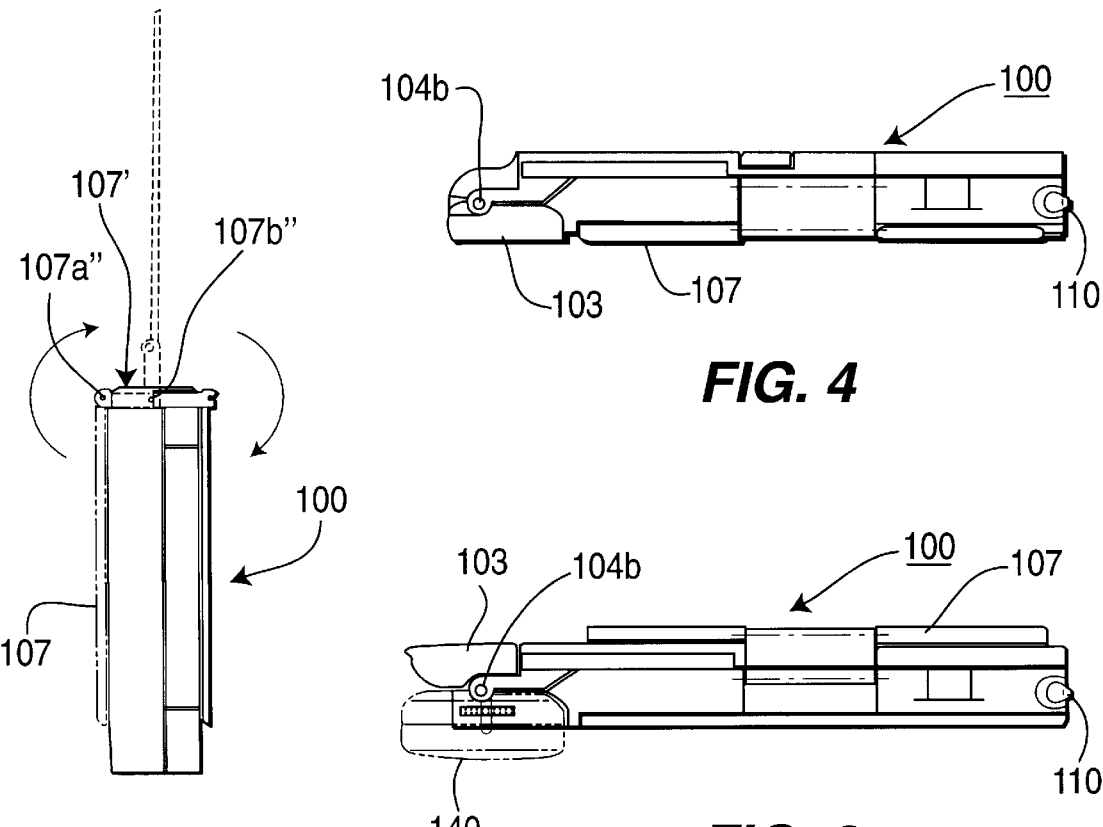
FIG. 5
FIG. 4
FIG. 8

PORTABLE COMPUTER ON WHICH A COMMUNICATION DEVICE CAN BE MOUNTED

CLAIM OF PRIORITY

This application makes reference to, incorporates the same herein, and claims all benefits accruing under 35 U.S.C. §119 from my application entitled PORTABLE COMPUTER ENABLING MOUNT OF PORTABLE RADIO PHONE filed with the Korean Industrial Property Office on Oct. 13, 1997 and there duly assigned Serial No. P97-52251 by that Office.

BACKGROUND OF THE INVETION

1. Technical Field

The present invention relates to a portable computer, on which a communication device can be mounted. More particularly, the invention relates to a portable computer which can be used while mounting a communication device on a part of the portable computer.

2. Related Art

Recently, with the rapid spread of the desktop computer, a portable computer while is easily transported has also become widespread. The portable computer can be in the form of a notebook computer or a hand held computer.

The portable computer is designed in such a size that the user can control it simply by hand, and particularly so that it can be conveniently carried from place to place, while performing the general function of a desktop computer.

There are many cases where users work both with a portable computer and with a communication device such as a wired or wireless phone and the like. In that case, if the communication device is not located in the same place as the portable computer, it is an inconvenience to the user. Therefore, there is a need in the art for a portable computer on which a communication device can be mounted.

SUMMARY OF THE INVENTION

Accordingly, in order to overcome such drawbacks in the art, it is an object of the present invention to provide a portable computer, on which a communication device can be mounted, so as to facilitate use of the portable computer and the communication device together with ease and at the same time.

To achieve these and other advantages and in accordance with the purpose of the present invention, as embodied and broadly described, there is provided a portable computer on which a communication device can be mounted. The portable computer comprises a main body, a battery on a part of the main body, and a mounting part for mounting a communication device on the part formed by the main body and the battery.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols represent the same or similar components, wherein:

FIG. 3 is a perspective view of a portable computer, as illustrated in FIG. 1.

FIG. 4 and FIG. 5 are side views of a portable computer cover, as illustrated in FIG. 3.

FIG. 7 and FIG. 8 are views which illustrate a process of mounting a communication device on a portable computer.

DETAILED DESCRIPTION OF PREFERRED EMBODIMENT

It will be apparent to those skilled in the art that various modifications can be made in the present invention without departing from the spirit of the invention. Thus, it is intended that the present invention cover such modifications as well as variations thereof, within the scope of the appended claims and their equivalents.

Figure 1:
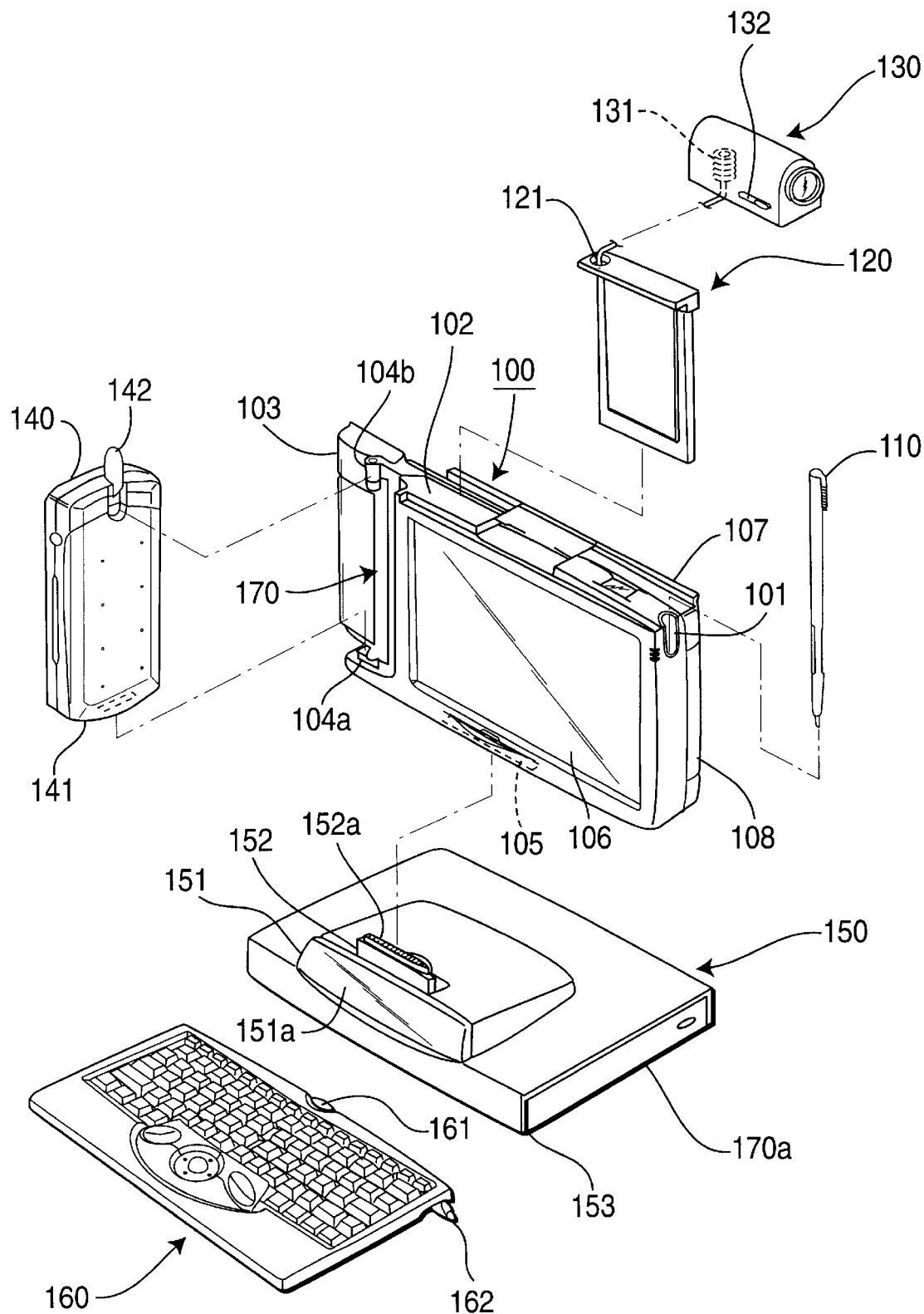
FIG. 1 is an unassembled view of a portable computer and a communication device according to the present invention.

As illustrated in FIG. 1, a portable computer on which a communication device can be mounted according to the present invention may use a main body 100 including a display 106, a battery 103 mounted rotatably on one side of the main body 100, and a communication device mounting-part 170 which can mount communication device 140 on the side formed by main body 100 and battery 103.

More particularly, an embodiment may be constructed with a main body 100 which has a mounting hole 101 formed in the upper right side, a male connection part 104a and a hinge 104b on the left side, a connection part 105 on the lower side, an electromagnetic pen 110 which is inserted into mounting hole 101 formed in the upper right side of the case of the main body 100, and a communication device 140. The device 140 has a female connection part 141 which mates with a male connection part 104a formed in the lower left part of the main body 100, and an extendable part 142 which fastens onto a hinge 104b formed in the upper left part of main body 100.

In this arrangement, the communication device 140 is mounted and supported on communication device mounting part 170 formed on an opened side of main body 100 after rotating battery 103 to the left away from main body 100.

A more complete appreciation of the invention will be obtained when considering the following accompanying drawings.

Figure 2:
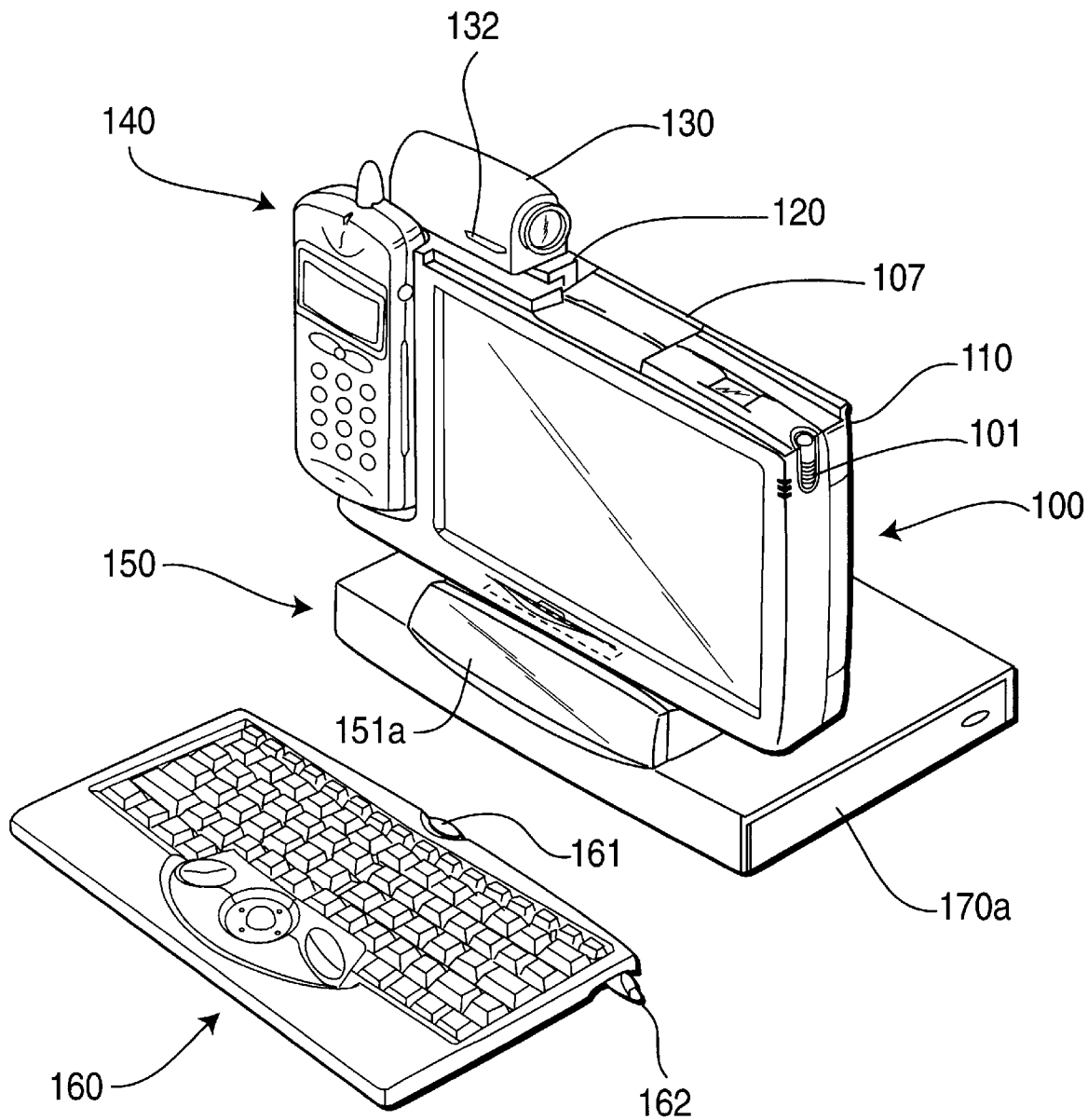
FIG. 2 is a perspective view of a portable computer and a communication device assembled according to the present invention.

As illustrated in FIG. 2 and FIG. 3, mounting hole 101 is formed in the upper right side of main body 100 case, and is formed in such a size as to match the external diameter of electromagnetic pen 110. Pen 110 can be kept in hole 100 when not in use. In connection part 102 (FIG. 1), formed in the upper left side of main body 100, a space is formed in such a size as to match the external appearance of PCMCIA card 120, so that PCMCIA card 120 can be inserted into the space in connection part 102.

In the space in which PCMCIA card 120 is mounted, an electrical connector(not illustrated) is formed so that a signal transmitted from a PCMCIA card 120, and a signal generated at the time that PCMCIA card 120 is mounted, can be transmitted to a signal arrangement circuit (not shown).

A hinge 131 (FIG. 1) formed on a digital camera 130 is positioned in a hole 121 formed in PCMCIA card 120 after PCMCIA card 120 is mounted on main body 100. When digital camera 130 is mounted, it can be rotated in the upper and lower, and left and right, directions centering around hinge 131. A button 132 is used to control the Zoom in/out function of digital camera 130.

When digital camera 130 is mounted on a hole 121 formed in PCMCIA card 120, a signal generated by digital camera 130 is transmitted to main body 100 through PCMCIA card 120 and a cable 133.

A signal transmitted to main body 100 is edited by a user through various application programs. Namely, data corresponding to signals transmitted from digital camera 130 can be edited after an application program has been chosen by using an electromagnetic pen 110. A print connector (not illustrated) prepared for printing edited data is so made that it can be protected by a connector cover 107.

In the left part of main body 100, battery 103 is mounted to be rotated around a hinge 104b. When battery 103 is opened by being rotated centrally around hinge 104b, a communication device mounting part 170 is formed by an exposed side of battery 103 and a side of main body 100.

Accordingly, if a battery 103 is rotated to the outside of main body 100, in order to mount communication device 140, a communication device mounting part 170 is formed, and on this communication device mounting part 170 a communication device 140 is mounted or can be adhered thereto.

After rotating and moving battery 103, a female connector part 141 formed in the lower inside of digital communication device 140 is mounted on a male connection part 104a formed in the lower left side of case of main body 100. At the same time, a retractable part 142 formed in a digital communication device 140 is mounted on a hinge 104b formed in the upper left side of main body 100 by providing a certain pressure.

Namely, communication device 140 is so adhered as to be supported by communication device mounting part 170. Specifically, a space is opened after battery 103 mounted on the case of main body 100 is rotated to the left, and an extendable part 142 is formed so as to have the same size or a smaller size as the size of a hinge 104b so as to prevent its separation by forced insertion, thereby fixing it to hinge 104b.

More particularly, a female connection part 105 formed in a lower part of main body 100 case is mounted on a male connection part 152 formed on a mounting part 151 of a stand 150. Once main body 100 is mounted on male connection part 152, a signal connection connector 152a formed in the interior of male connection part 152 is connected to an electrical connector (not illustrated) formed in the interior of a female connection port 105 formed in the lower part of main body 100.

As shown, when main body 100 is mounted on stand 150, a signal transmitted to a light receiving part 151a formed in a mount 151 of stand 150 is transmitted to main body 100 through an interior circuit of stand 150.

At this point, infrared(IR) light generated in IR radiating part 161 is transmitted to a light receiving part 151a and is converted into an electric signal by light receiving part 152. The electric signal is then transmitted to main body 100. A support 162 formed in a keyboard 160 is naturally oriented at an established angle in order to transmit IR precisely to a light receiving part 151a formed in mount 151 of stand 150.

A peripheral retractable part 153 formed in the right side of stand 150 is designed to be used for pulling on or out a DVDP as an auxiliary peripheral device or an FPD (not illustrated). In FIG. 2 it can be seen how a communication device 140 is mounted on main body 100 through this process.

More particularly, we can see how communication device 140 is mounted on main body 100 with the accompanying drawings as follows.

FIG. 3 and FIG. 4 illustrate how main body 100, when not in use, has a cover 107 and a battery 103 mounted thereon. Moreover, in order to use main body 100, cover 107 is opened in the same direction as shown by arrows in FIG. 5.

Figure 6:
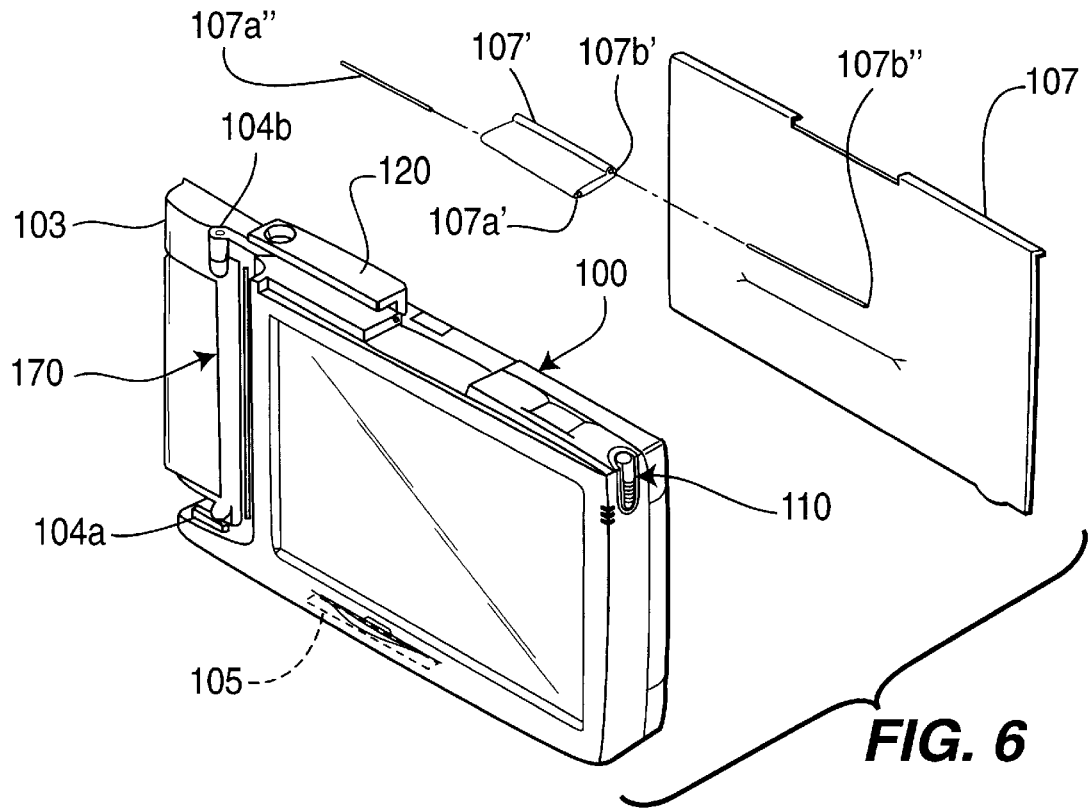
FIG. 6 is an unassembled view of a portable computer cover.
Figure 7:
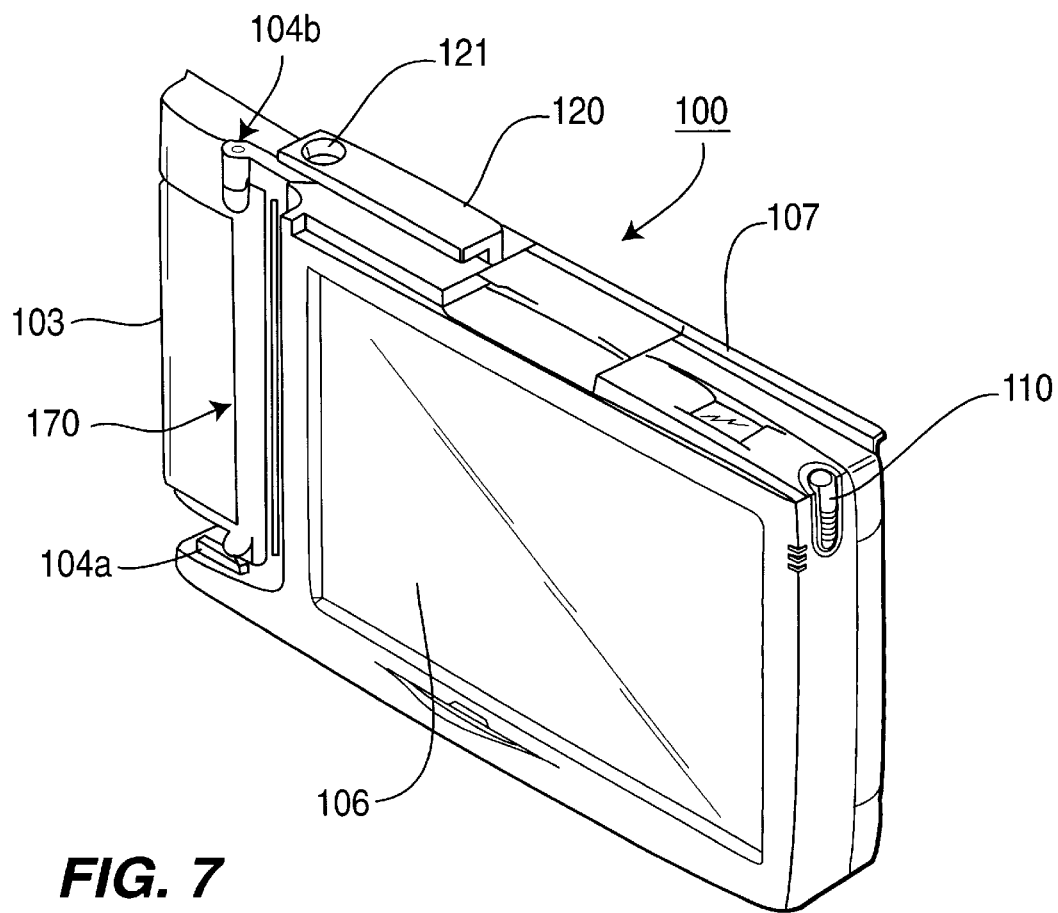

Cover 107 is mounted on the upper side of main body 100 by folded hinge 107'. Folded hinge 107' comprises, as shown in FIG. 6, a first fixing hole 107a' and a first fixing pin 107a", and a second fixing hole 107b' and a second fixing pin 170b". Folded hinge 107' is fixed to the upper side of main body 100 by second fixing pin 107b".

Cover 107 is opened in the vertical direction. First, hinge 107' is opened by removing pin 107a" from first fixing hole 107a'. Subsequently, cover 107 is rotated to the backside of main body 100 by rotating hinge 107' to the backside, and cover 107 is continuously adhered to the back side by reinserting first fixing pin 107a" into first fixing hole 107a.

When cover 107 of main body 100 is opened through this process, communication device 140 is mounted on main body 100 as shown in FIG. 8. Namely, communication device mounting part 170 is formed by opening battery 103 in the leftward direction after rotating it while centering it around hinge 104b.

When communication device mounting part 170 is formed by opening of battery 103, a female connection part 141 (FIG. 1) formed in the lower interior of communication device 140 is mounted on a male connection part 104a formed in the lower left side of main body 100. At the same time, a retractable part 142 formed on communication device 140 is mounted on a hinge 104b formed in the left upper side of main body 100 by providing a certain amount of pressure.

Communication device 140 is mounted through the above described process, and can be dismounted through a reversal of the mounting process.

As explained in the above, the present invention has, by rotating hinge 107' to the backside, the advantageous effect of maintaining a communication device more conveniently by mounting it on a portable computer when the portable computer is in use.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A portable computer on which a communication device can be mounted, said portable computer comprising:
   a main body;
   a battery rotatably mounted on said main body; and
   a mounting part for a communication device, said mounting part mounting said communication device on a part formed by said main body and said battery;
   wherein said mounting part is exposed by rotating said battery around a hinge disposed on said main body.

2. The portable computer as claimed in claim 1, wherein said mounting part includes a protruding connecting part which is connected to a corresponding connecting part on said communication device, and a further hinge which is connected to an extendable part on said communication device.

3. The portable computer as claimed in claim 1, further comprising a stand for supporting said main body, said main body having a first connector and said stand having a second connector engageable with said first connector.

4. The portable computer as claimed in claim 3, wherein said stand includes a light receiving part for receiving a signal and circuit means connected to said light receiving part for transmitting said signal to said main body.

5. The portable computer as claimed in claim 4, further comprising a keyboard including a light generating part for generating light and transmitting said light to said light receiving part.

6. The portable computer as claimed in claim 1, further comprising a hinge fixed to a first side of said main body and a cover connected to said hinge, said hinge and said cover being rotatable to a first position wherein said cover covers a second side of said main body, and said hinge and said cover being rotatable to a second position wherein said cover covers a third side of said main body.

7. The portable computer as claimed in claim 6, wherein said hinge has a first edge fixed to said first side and is rotatable about an axis extending along a length of said first side, said hinge having a second edge connected to said cover, said cover being rotatable about an axis extending along a length of said second edge.

8. The portable computer as claimed in claim 6, further comprising first and second pins insertable into first and second holes, respectively, formed in said first and second edges, respectively.

9. A portable computer on which a communication device can be mounted, said portable computer comprising:
   a main body;
   a battery rotatably mounted on said main body; and
   a mounting part for a communication device, said mounting part mounting said communication device on a part formed by said main body and said battery;
   wherein said mounting part includes a protruding connecting part which is connected to a corresponding connecting part on said communication device and a hinge which is connected to an extendable part on said communication device.

10. A portable computer on which a communication device can be mounted, said portable computer comprising:
    a main body;
    a battery rotatably mounted on said main body; and
    a mounting part for a communication device, said mounting part mounting said communication device on a part formed by said main body and said battery;
    wherein said main body has a portion which is discontinuous so as to form a slot therein for receiving a substantially flat object;
    said portable computer further comprising a hinge mounted on said substantially flat object and positioned in said slot for mounting a digital camera on said substantially flat object.

11. The portable computer as claimed in claim 10, wherein said digital camera is rotatable about said hinge.

12. The portable computer as claimed in claim 10, wherein said substantially flat object comprises a PCMCIA card, and wherein a signal generated by said digital camera is transmitted to said portable computer via said PCMCIA card.

13. A portable computer, comprising:
    a main body; and
    a mounting part for mounting a communication device on a part of said main body;
    wherein said mounting part includes a protruding connecting part which is connected to a corresponding connecting p)art on said communication device and a hinge which is connected to an extendable part on said communication device.

14. The portable computer as claimed in claim 13, wherein said main body has a portion which is discontinuous so as to form a slot therein for receiving a substantially flat object.

15. The portable computer as claimed in claim 14, further comprising an electrical connector mounted in said slot for receiving and transmitting an electrical signal from said substantially flat object.

16. The portable computer as claimed in claim 14, further comprising a further hinge mounted on said substantially flat object and positioned in said slot for mounting a digital camera on said substantially flat object.

17. The portable computer as claimed in claim 16, wherein said digital camera is rotatable about said further hinge.

18. The portable computer as claimed in claim 16, wherein said substantially flat object comprises a PCMCIA card, and wherein a signal generated by said digital camera is transmitted to said portable computer via said PCMCIA card.

19. A portable computer, comprising:
    a main body having a first side, a second side and a third side, said second and third sides being parallel to each other and interconnected by said first side;
    a first hinge fixed to said first side of said main body;
    a cover connected to said hinge, said hinge and said cover being rotatable to a first position wherein said cover lies flat against and covers said second side of said main body, and said hinge and said cover being rotatable to a second position wherein said cover lies flat against and covers said third side of said main body;
    a second hinge extending laterally from said first side and distally beyond said second side to retentively engage a first portion of a communication device; and
    a fourth side generally parallel to said first side and positioned between said second side and said third side, said fourth side including a mounting extending laterally beyond said second side to operationally engage a second portion of the communication device while displaying the communication device in spaced juxtaposition to said second side.

20. The portable computer as claimed in claim 19, wherein said first hinge has a first edge fixed to said first side and is rotatable about an axis extending along a length of said first side, said first hinge having a second edge connected to said cover, said cover being rotatable about an axis extending along a length of said second edge.

21. The portable computer as claimed in claim 20, further comprising first and second pins insertable into first and second holes, respectively, formed in said first and second edges, respectively.

* * * * *